United States Patent [19]

Ferguson

[11] Patent Number: 4,583,637
[45] Date of Patent: Apr. 22, 1986

[54] CONVEYING APPARATUS

[75] Inventor: William B. Ferguson, Perrysburg, Ohio

[73] Assignee: Roe Incorporated, Perrysburg, Ohio

[21] Appl. No.: 698,732

[22] Filed: Feb. 1, 1985

Related U.S. Application Data

[63] Continuation of Ser. No. 432,315, Sep. 30, 1982, abandoned.

[51] Int. Cl.$^4$ ............................................. B65G 13/04
[52] U.S. Cl. ..................................... 198/787; 198/790
[58] Field of Search ................................. 198/787, 790

[56] References Cited

U.S. PATENT DOCUMENTS

| | | | |
|---|---|---|---|
| 2,016,700 | 10/1935 | Anderson | 198/787 |
| 3,610,404 | 10/1971 | Fleischauer | 198/790 X |
| 3,826,351 | 7/1974 | Fromme | 198/787 |
| 3,840,110 | 10/1974 | Molt et al. | 198/781 |
| 3,961,700 | 6/1976 | Fleischauer | 198/790 |
| 4,193,492 | 3/1980 | Hammond | 198/787 X |

Primary Examiner—Joseph E. Valenza
Assistant Examiner—Stuart J. Millman
Attorney, Agent, or Firm—Marshall & Melhorn

[57] ABSTRACT

A drive system for a curved, live roller conveyor comprised of two groups of rollers is disclosed. The drive system includes separate drives, one for each group of rollers and a common power source for rotatably driving each of the separate drives. Each roller group drive includes a pair of parallel arranged drive shafts which drive corresponding individual rollers through an elastomeric belt entrained about pulleys affixed to the drive shaft and the rollers.

2 Claims, 3 Drawing Figures

4,583,637

CONVEYING APPARATUS

This is a continuation of application Ser. No. 432,315, filed Sept. 30, 1982, now abandoned.

BACKGROUND OF THE INVENTION

This invention relates to article conveyors and, particularly to a novel driving system for individually driving closely spaced rollers of an arcuate conveying system.

In the continuous transport of articles along a conveying line, it is necessary to use closely spaced live rollers for producing a continuous flow of the articles. A paramount problem lies in the driving the individual rollers when it becomes necessary to transport the articles around sharply curved conveying sections.

Various types of curved conveying sections have been proposed in the past for producing a continuous flow of articles. A basic problem in the past has been in attempting to individually drive closely spaced rollers around an arcuate path. For example, in U.S. Pat. No. 3,610,404, issued on Oct. 5, 1971, there is disclosed a curved, live roller conveyor employing straight or tapered rolls driven from a common, power drive shaft through a system of pulleys and elastomeric belts. This drive system is not suitable for driving an array of closely spaced rollers of a sharply curved arcuate conveying section in that the common drive shaft and pulley system requires much more space than is normally available.

Other types of roller drive systems have included powering a common drive shaft constructed of universal joints. However, in such mechanisms the universal joints consume line drive shaft space, thereby limiting the number of rollers directly driven from the drive shaft.

SUMMARY OF THE INVENTION

In conveying apparatus constructed in accordance with the invention, small articles can be continuously transported around small arcuate driven conveying sections without the possibility of the flow of the articles being under-powered as is the case of curved conveying sections employing widely spaced rollers. Briefly, the arcuate conveying section involves dividing the plurality of rollers into two groups and individually driving the rollers of each group from a common power source. Specifically, each group of rollers is driven from a common power drive shaft system comprising at least a pair of parallelly arranged drive shafts for rotatably driving one of the groups of rollers and another pair of parallelly arranged drive shafts disposed at an angle to the first pair of drive shafts for rotatably driving the other group of rollers. The individual rollers of each group are adapted to be driven through a system of pulleys and elastomeric belts.

An object of the invention is to produce a conveyor apparatus which will permit the transmission of power to and through a curved section thereof from adjacent conveyor sections by utilizing a line shaft, elastomeric belt and associated pulleys resulting in a system permitting each of the associated rollers to be individually powered.

Another object of the invention is to produce a drive system for an arcuate live roller conveyor section which employs closely spaced rolls for the continuous conveying of separated articles.

BRIEF DESCRIPTION OF THE DRAWINGS

The above, as well as other objects of the invention, will become readily apparent to one skilled in the art from reading the following detailed description of a preferred embodiment of the invention when considered in light of the accompanying drawings in which.

DETAILED DESCRIPTION OF THE PREFERRED EMBODIMENT

Figure 1A:
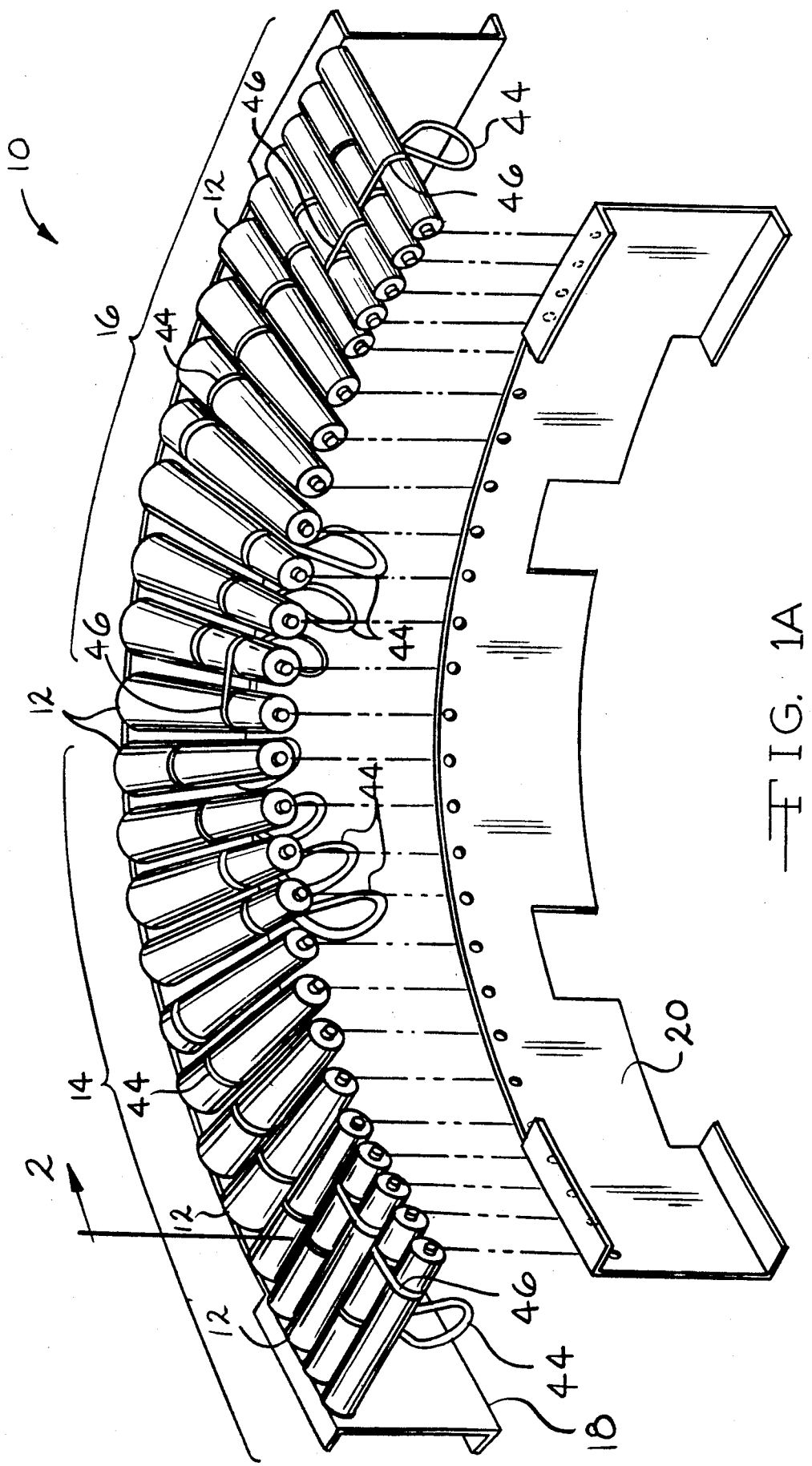
FIGS. 1A and 1B are an exploded perspective view of a curved live roller conveyor constructed in accordance with the invention.

Referring to the drawings where like reference numerals designate similar parts throughout there is illustrated a curved conveyor section 10 in which a plurality of individually driven, transversely extending rollers 12 are divided into first and second groups 14 and 16, respectively. For convenience, the first group 14 will be considered as the entrance end of the conveyor section and the second group 16 will be considered as the exit end of the conveyor. The rollers 12 are rotatably supported in a conventional manner (see FIG. 2) between arcuately shaped spaced apart rails 18 and 20. Since the roller supporting structure of the conveyor is conventional, further description is not deemed necessary.

Figure 1B:
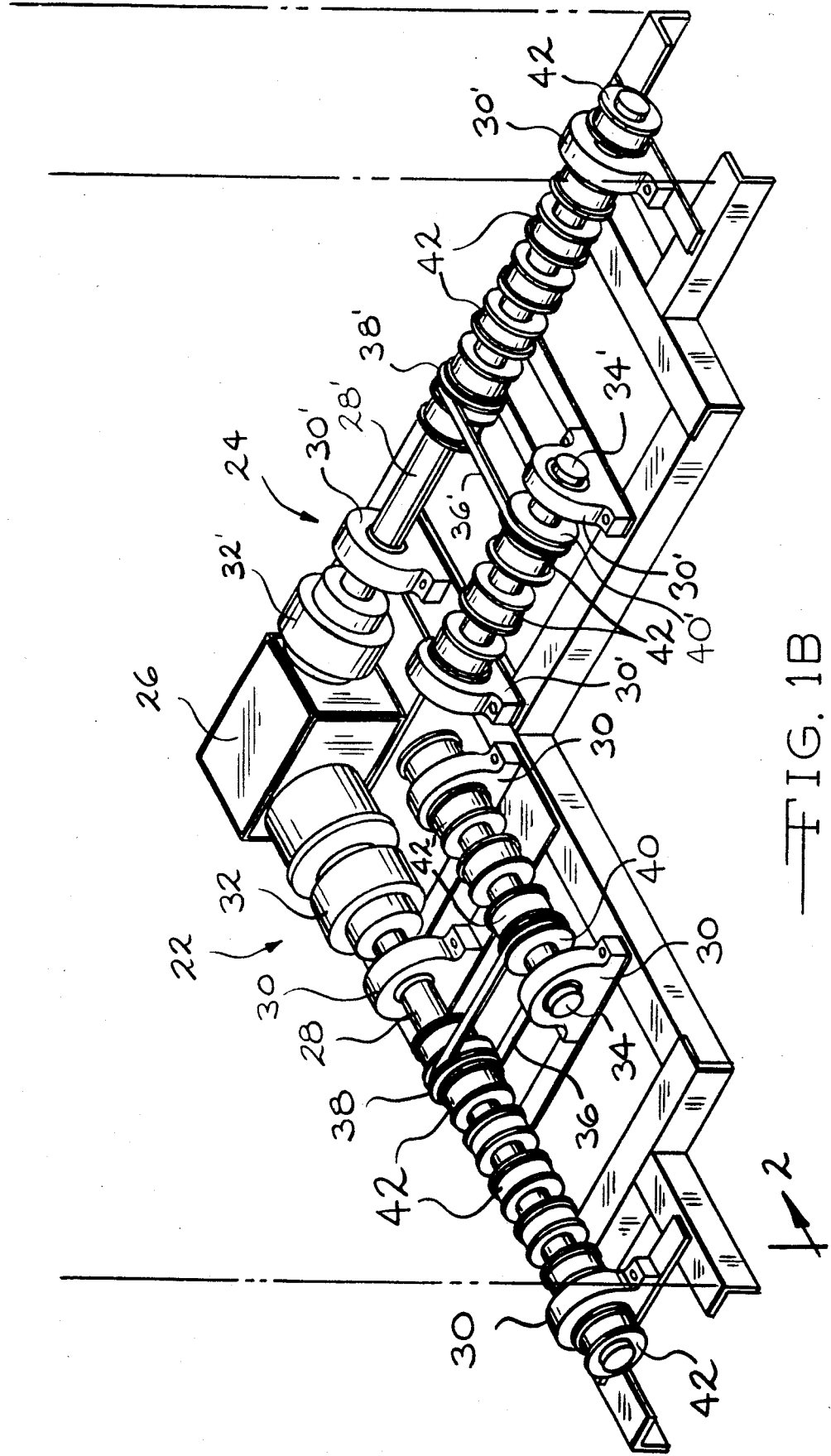

As best illustrated in FIGS. 1A and 1B, the rollers 12 of each group 14 and 16 are rotatably driven by first and second driven means 22 and 24, respectively. The driven means 22 and 24 are gearingly interconnected through suitable gearing housed within a gear drive unit 26. Since each drive means 22 and 24 is substantially similar, a description of the drive means 22 will suffice as a description of the drive means 24, the common elements being designated by prime reference numbers.

As shown, the drive means 22 includes a first elongate drive shaft 28 journalled for rotation in pillow blocks 30 below some of the rollers 12 of the first group of rollers 14. The drive shaft 28 is coupled to the gear unit 26 by a coupling 32.

A second drive shaft 34, also journalled in pillow blocks 30, is disposed parallel to the first drive shaft 28 and below the remaining rollers 12 of the first group of rollers 14. The second drive shaft 34 is rotatably driven from the first drive shaft 28 by a belt 36 entrained around pulleys 38 and 40 fixedly mounted for rotation with the first and second drive shafts 28 and 34, respectively.

It will be understood that suitable driving motor means may be directly coupled to either the drive shaft 28 or 28'.

Figure 2:
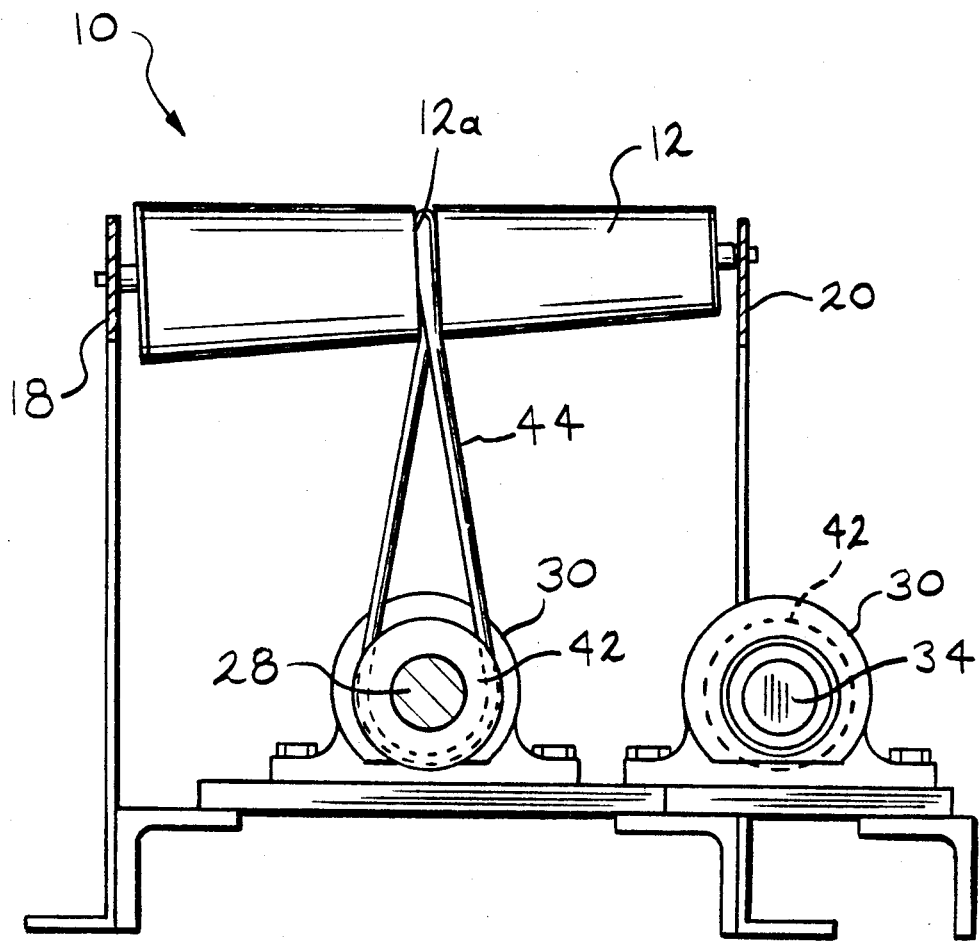
FIG. 2 is an enlarged cross sectional view of the roller drive structure taken substantially along line 2—2 in FIGS. 1A and 1B.

Spaced along the length of each drive shaft 28 and 34 are a plurality of spool-shaped pulleys 42, one for each roller 12 of the group 14. The pulleys 42 are positioned on the shafts 28 and 34 below respective ones of the rollers 12 for rotation therewith. Rotational drive is transferred from each pulley 42 to its associated roller 12 through a resilient drive belt 44, preferably an elastomeric O-ring belt of circular cross-section. The belt 44 is looped around the pulley 42, twisted, and looped around a corresponding groove 12a provided around the circumference of the roller 12 as illustrated in FIG. 2.

Normally, the pulleys 42 are free to rotate about their associated supporting drive shafts. However, the tension produced by the associated elastomeric belts is sufficient to increase the coefficient of friction between the pulleys and the supporting drive shafts to produce simultaneous rotation. It will be noted that should a roller 12 become stalled, an overriding clutching action will occur between the driving shaft and its associated pulley to militate against destruction of the belt.

It should be noted that for manufacturing convenience, a roller 12 is disposed between the first and second roller groups 14 and 16 and rotatably driven by the first adjacent roller of the second roller group 16 through a belt 46. Also, in the illustrated embodiment, the rollers 12 adjacent the entrance and exit ends of the conveyor section 10 may be rotatably driven by belt 46 entrained above corresponding grooves 12a' provided in adjacent rollers 12 for minimizing the amount of space required by the first and the second drive means 22 and 24.

It will be appreciated from the foregoing description that the invention has resulted in an arcuate conveyor which is capable of continuously transporting articles around bends over a large range of size and radii.

In accordance with the provisions of the patent statutes, the principle and mode of operation of the invention have been explained and what is considered to represent its preferred embodiment has been illustrated and described. It should, however, be understood that the invention may be practiced otherwise than as specifically illustrated and described without departing from its spirit and scope.

What is claimed is:

1. In a live roller conveyor having a plurality of closely spaced rollers angularly disposed in a common plane to define an arcuate conveying line, the improvement comprising:

a group of angularly disposed rollers including a first portion located along a first arcuate path and a second portion different from said first portion and located along a second arcuate path spaced from said first arcuate path; and a drive means for rotatably driving said group of angularly disposed rollers, said drive means including a main drive shaft, an auxiliary drive shaft disposed in laterally spaced apart parallel relation to said main drive shaft, means for driving said auxiliary drive shaft from said main drive shaft, and separate means to individually drive each of said rollers, said main drive shaft coupled by said separate means to individually drive said first portion of said group of rollers and said auxiliary drive shaft coupled by said separate means to individually drive said second portion of said group of rollers.

2. The conveyor according to claim 1 wherein said group of rollers is a first group of rollers and said drive means is a first drive means and the conveyor further comprises:

a second group of angularly disposed rollers different from said first group of rollers and located in the common plane;

a second drive means angularly disposed relative to said first drive means for rotatably driving said second group of angularly disposed rollers, said second drive means including a main drive shaft, an auxiliary drive shaft disposed in parallel relation to said main drive shaft, and means for driving said auxiliary drive shaft from said main drive shaft;

means for commonly rotatably driving said main drive shaft of each of said first and second drive means; and means operatively associated with said main drive shaft and said auxiliary drive shaft of said second drive means and said second group of rollers for rotatably driving said second group of rollers.

* * * * *